Nov. 8, 1949   F. A. G. KOENIG   2,487,341
MECHANICAL COMPUTING APPARATUS
Filed Jan. 27, 1947
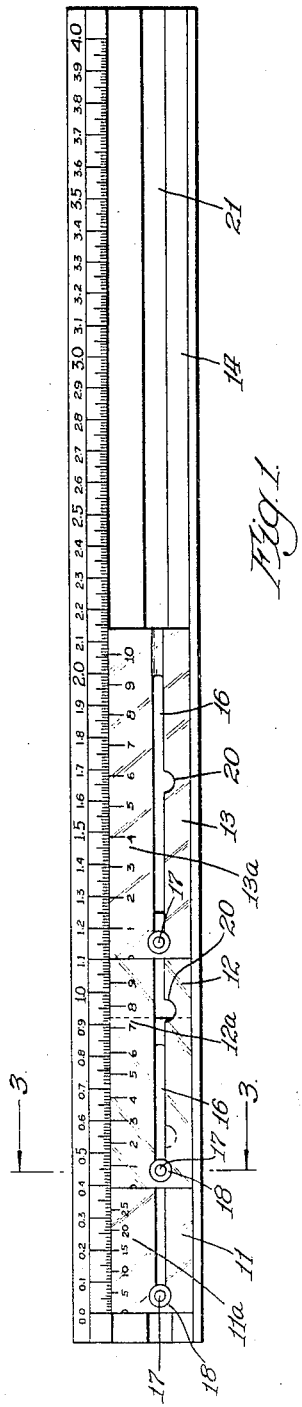
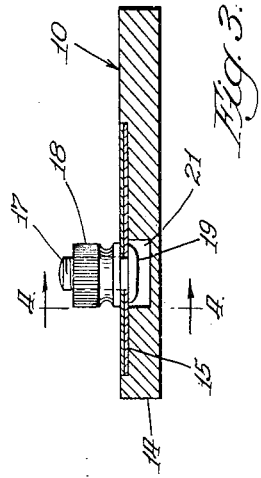
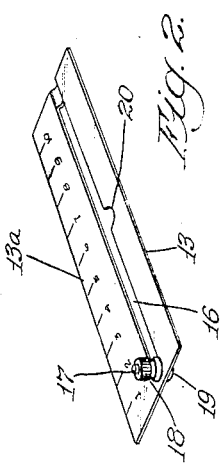
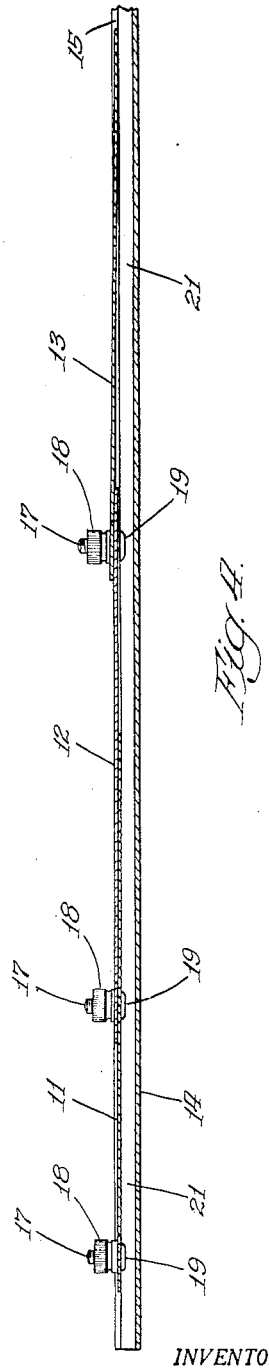
INVENTOR.
Frederick A. G. Koenig
BY
Harvey M. Gillespie
Atty Patented Nov. 8, 1949

2,487,341

UNITED STATES PATENT OFFICE 2,487,341

MECHANICAL COMPUTING APPARATUS

Frederick A. G. Koenig, Chicago, Ill., assignor to Anna C. Koenig, Chicago, Ill.

Application January 27, 1947, Serial No. 724,575

7 Claims. (Cl. 235—70)

This invention relates to improvements in computing apparatus suitable for use in computations involving the use of a plurality of variable quantities having different characteristic values to provide a desired total value.

A principal object of the invention is to provide a simplified apparatus with which intricate problems of the above character including cents and per cent computations can be readily and accurately solved by all persons including those having no knowledge of the mathematical principles involved in the computation.

A more specific object of the invention is to provide a computing apparatus which is particularly suitable for use in determining the exact quantities of a plurality of materials required, when such materials contain different values of a common characteristic, to provide a blend, mixture, compound, or collection of separate materials containing in the aggregate a desired volume, strength, weight, or other appropriate value of said common characteristic.

The apparatus embodying the principles of the invention, as disclosed herein to show one suitable embodiment thereof, may be described briefly as comprising a main scale having graduations thereon to be selected as the total value of a substance desired in a single material mixture, composition or aggregate product made up of one or more component materials. A plurality of separate scales, each representing a component material, are provided with graduations along their edges and arranged in overlapped relation adjacent the main scale. This overlapped arrangement permits the graduations on the separate scales which are not covered by an overlying scale to be observed and read in connection with the graduations on the main scale.

The graduations on the main scale have uniform spacings and correspond to cents or percentage measures of a predetermined linear distance. The graduations on each of the overlapped scales represent equal measures by weight of one-hundred pounds of the component material represented by the scale. The linear distance representing one-hundred pounds of such material is based upon the percentage of the desired substance contained in the material. For example, if the component material contains one per cent (1%), to wit, one pound per each one-hundred pounds of the desired substance, the one-hundred per cent (100%) linear distance of the component scale will equal only one per cent (1%) of the linear distance of the total percentage of the main scale. If the component material contains fifty per cent (50%), to wit, fifty pounds of the desired substance per each one-hundred pounds of material, the one hundred per cent (100%) linear distance of the component scale representing such material will equal one-half of the full per cent linear distance of the main scale. Therefore each graduation on such component scale will be equal to one-half the linear value of a corresponding graduation on the main scale. It will be seen, therefore, that the graduations on each of the component scales are proportional to the percentage graduations on the main scale in the same ratio as the total per cent linear value of the component scale bears to the total per cent linear value of the main scale.

The exposed graduations on the component scales which lie at the left of the total selected on the main scale represent the respective amounts of the component materials required to provide the amount of the particular substance desired.

It is, therefore, a specific object of the present invention to provide an apparatus which is constructed and will function in the manner above briefly described.

The invention is illustrated, in certain preferred embodiments, in the accompanying drawing wherein:

Fig. 1 is a plan view of a mechanical computing device constructed in accordance with this invention.

Fig. 2 is a view in perspective of one of the scale members forming a part of the apparatus shown in Fig. 1.

Fig. 3 is a cross-sectional view taken on line 3—3 of Fig. 1, but illustrating the parts on a larger scale.

Fig. 4 is a fragmentary longitudinal section taken on line 4—4 of Fig. 2.

The invention is illustrated in this application in connection with a problem encountered in providing a stock ration which will contain an appropriate quantity of digestible protein. It is to be understood, however, that the specific use illustrated herein is merely for the purpose of illustrating the principles of the invention and is not intended as a limitation of the use of the apparatus. Obviously the scales used in connection with the apparatus might be graduated to represent any characteristic property of a plurality of component materials used in a blend, mixture, compound, ration or other end product composed of a plurality of materials and containing a desired quantity of one or more desired substances.

Referring to the drawing, the invention comprises a main scale 10 and a plurality of scales which are overlapped in the direction of their length and arranged lengthwise of the scale 10 so that graduations thereon may be read in conjunction with the graduations of the main scale 10. There may be any desired number of separate scales, one for each component quantity embraced in the computation. For the purpose of simplifying the disclosure of the present application, only three separate scales 11, 12 and 13 are used. These scales are provided with graduations 11a, 12a and 13a which are arranged along the edges of the scales which abut the main scale 10.

The main scale 10 is marked on a base member 14 which is provided with a shallow channel 15 corresponding in width to that of the scales 11, 12 and 13, etc., so as to hold them in overlapped alignment. Each of the separate scales is formed with a lengthwise slot 16 adapted to receive the shank portion of a bolt 17. A thumb nut 18 is threaded onto the bolt so that the head 19 of the bolt and the screw nut 18 may be moved into clamping engagement with opposite faces of the separate scales. The slots 16 in each of the separate scales is provided with a lateral recess 20 which permits the head 19 of the bolt of one scale to be inserted into the slot 16 of an adjacent scale. In this way a series of the separate scales may be releasably clamped together to form a unitary scale assembly. In order to provide suitable clearance for the bolt head 19, the base member 14 is provided with a deeper groove 21.

The main scale 10 is provided with graduations which represent per cent measures of a predetermined linear distance. Only four per cent (4%) of said predetermined distance is shown in the drawing, since this distance is sufficient for a full disclosure of the principles of the invention. Each per cent unit of said main scale is also divided into one-hundred equal spaces. Groups of ten of these spaces are legended to indicate each tenth of one per cent (0.1%). The per cent measures 1, 2, 3 and 4, of course, can be read as any larger or smaller number desired by adding additional ciphers before or after the digit indicated.

The separate scales for cooperative use with the main scale are each provided with per cent graduations thereon which are based upon the total per cent linear value which the separate scales bears to the total per cent linear value of the main scale. For example, assuming that the total graduations 11a of scale 11 has a linear value of one and three-tenths per cent (1.3%) of the total per cent linear value of the main scale and that the linear value of said scale 11 is divided into one-hundred equal parts, each part would represent one per cent of the total length and would be proportional to corresponding graduations of the main scale 10 at the same ratio as the total linear value of the separate scale stands to the total per cent linear value of the main scale. Consequently it will require one-hundred graduations 11a of scale 11 to equal the linear measure of 1.3 corresponding graduations on the main scale. If the linear value of scale 12 is seven per cent (7.0%) of the value of the main scale and is divided into an equal number of percentage graduations, the distance between the graduations 12a will be only seven-tenths (0.7) of the distance between corresponding graduations on the main scale. Consequently it will require one- hundred of the graduations 12a to equal seventy of the corresponding graduations on the main scale. As a further illustration it can be assumed that the linear value of scale 13 represents only nine and three-tenths per cent (9.3%) of the total per cent linear value of the main scale and the scale is provided with an equal number of per cent graduations, the spacing between graduations thereof will be only ninety-three hundreds (.93) of the distance between corresponding graduations of the main scale. Consequently it will require one-hundred graduations 13a of scale 13 to equal the linear distance of ninety-three corresponding graduations of the main scale.

It will now be seen that if the percentage graduations on the separate scales 11, 12 and 13 represent quantities used in the computation, for example, quantities of materials containing the percentages indicated, to wit 1.3%, 7.0% and 9.3% of a characterizing ingredient, the sum of the exposed graduations on the several scales 11, 12 and 13 represent the total volume of the component materials required to obtain the quantity of the characterizing ingredient desired. For example, if 1.6 were selected on the main scale to indicate the pounds of characterizing ingredient desired, the exposed graduations on the separate scales at the left of the total selected indicate the pounds of each component material required.

In order to illustrate one practical application of the invention, the scales 11, 12 and 13 may be treated as representing separate stock feeds available on a farm to provide a stock ration for a dairy cow. Assuming also that the weight and milk production of the cow is such that she will consume forty-five to fifty pounds of feed and that she requires, in that quantity of feed, 1.6 pounds of digestible protein. If the available feeds for the daily ration include corn silage containing one and three-tenths per cent (1.3%) of digestible protein, the scale 11 can be used to designate this feed. If the available feeds include red clover containing seven per cent (7.0%) digestible protein, the scale 12 may be used to represent red clover. If the available feeds include barley containing nine and three-tenths per cent (9.3%) digestible protein, the scale 13 may be used to represent this feed component of the daily ration. The three scales 11, 12 and 13 may be arranged in any overlapped order desired and the exposed graduations lying at the left of the selected total on the main scale representing the desired protein content (1.6 pounds), will indicate the pounds of each feed which will be required to provide a ration having total protein content desired. When the scales are overlapped as indicated in Fig. 1, the stock ration would be composed of thirty pounds of corn silage, ten pounds of red clover and five and one-quarter pounds of barley.

It will be observed by inspection of Fig. 1 that the sum of the exposed graduations on scales 11, 12 and 13 which lie at the left of the selected total 1.6 on the main scale aggregate forty-five and one-quarter pounds of total feed to be consumed by the animal for which the ration is computed. If it is desired to add more volume to the ration without altering the total per cent of protein the scale 12 can be moved to the right so as to expose an additional five pounds of the corn silage and then shift the barley scale 13 to the left to make up for any loss in the protein total caused by shifting the said scale 12.

When the computing apparatus is used in connection with mixtures other than live stock ration, the separate scales 11, 12, 13, etc., are provided with graduations representing the characteristic desired to be measured in the mixture or association of materials, for example foods, metals, liquors, color pigments, etc. When the separate scales of the various materials are arranged in their overlapped relation as indicated in the drawing, the totals of the exposed graduations of the several scales lying at the left of the desired total on the main scale will indicate the quantity or value of materials used in the combination.

I claim:

1. A mechanical computing device comprising a main scale having uniformly spaced graduations thereon representing percentage measures of a predetermined linear value, and a plurality of separate scales for use in conjunction therewith and movably positioned in overlapped relation adjacent to the main scale and provided in each case with graduations thereon which are differently spaced relative to the graduations of the other overlapped scales and which represent, in each case, percentage graduations which are proportional to corresponding graduations on the main scale in the same relation as the total per cent linear value of the separate scale bears to the total per cent linear value of the main scale.

2. A mechanical computing device comprising a main scale having uniformly spaced graduations thereon representing percentage measures of a predetermined linear value, and a plurality of separate scales representing different linear values for use in conjunction therewith and movably positioned in overlapped relation adjacent to the main scale and provided in each case with graduations thereon which are differently spaced relative to the graduations of the other overlapped scales and which represent, in each case, percentage graduations which are proportional to corresponding graduations on the main scale in the same relation as the total per cent linear value of the separate scale bears to the total per cent linear value of the main scale, whereby the value of a separate scale in a total selected on the main scale may be varied, without altering the total selected, by shifting one or more of said separate scales lengthwise to increase or decrease the number of graduations exposed to view.

3. A mechanical computing device comprising a base member provided with scale graduations extending lengthwise thereof and representing percentage measures of a predetermined linear value, a plurality of separate scales movably overlapped in the direction of their length and arranged adjacent the scale on the base to cooperate therewith, each separate scale being provided with scale graduations thereon which are differently spaced relative to the graduations of the other overlapped scales and are, in each case, proportioned at a predetermined ratio to the graduations on said base.

4. A mechanical computing device comprising a base member provided with scale graduations thereon extending lengthwise thereof and representing percentage measures of a predetermined linear value, a plurality of separate scales, movably overlapped in the direction of their length and arranged adjacent the scale on the base to cooperate therewith, each separate scale representing like quantities, but of different values and provided with scale graduations thereon which are differently spaced relative to the graduations of the other overlapped scales and are, in each case, proportional at a predetermined ratio to the graduations on said base, whereby the relative positions of said separate scales may be shifted to vary their aggregate quantities without altering their aggregate values as measured on the first mentioned scale.

5. A mechanical computing device comprising a base member provided with a longitudinal trough channel and with scale graduations thereon at one side of said trough channel and extending longitudinally of the base and representing percentage measure of a predetermined linear value, a plurality of separate scales movably overlapped in the direction of their length and arranged in said trough or channel adjacent the first mentioned scale, each separate scale representing like quantities, but of different values and provided with scale graduations thereon which are differently spaced relative to the graduations of the other overlapped scales and are, in each case, proportional at a predetermined ratio to the graduations on said base.

6. An apparatus for mechanically determining the amounts of different materials containing a common ingredient which are required to provide a predetermined amount of said ingredient, the combination of a main scale provided with graduations thereon having predetermined linear spacings and representing selective totals of such ingredient desired and a plurality of separate scales movably overlapped in the direction of their length adjacent the main scale and representing like quantities of materials, but containing different values of said ingredient and each scale provided with graduations for quantities of the material represented by such scale, which graduations are proportional to the graduations of the main scale in relation to the percentage of said ingredient contained in the material.

7. An apparatus for mechanically determining the amounts of different materials containing a common ingredient which are required to provide a predetermined amount of said ingredient, the combination of a main scale provided with graduations thereon having predetermined linear spacings and representing selective totals of such ingredient desired and a plurality of separate scales movably overlapped in the direction of their length adjacent the main scale and representing materials containing different values of said ingredient and each scale provided with graduations for uniform quantities of the material represented by such scale, which graduations are proportional to the graduations of the main scale in relation to the percentage of said ingredient contained in the material whereby the exposed graduations on the separate scales show the collective amount of materials required.

FREDERICK A. G. KOENIG.

REFERENCES CITED

The following references are of record in the file of this patent:

UNITED STATES PATENTS

| Number | Name | Date |
| --- | --- | --- |
| 944,218 | Sommer | Dec. 21, 1909 |
| 1,599,582 | Moyer | Sept. 14, 1926 |
| 2,359,837 | Freedlander | Oct. 10, 1944 |

FOREIGN PATENTS

| Number | Country | Date |
| --- | --- | --- |
| 335,443 | Germany | Apr. 2, 1921 |